US012669206B1

(12) United States Patent
Nichols

(10) Patent No.: US 12,669,206 B1
(45) Date of Patent: Jun. 30, 2026

(54) CORPORATION STOP AND ADJUSTABLE SADDLE APPARATUS AND METHOD

(71) Applicant: Brunson Nichols, Andalusia, AL (US)

(72) Inventor: Brunson Nichols, Andalusia, AL (US)

( * ) Notice: Subject to any disclaimer, the term of this patent is extended or adjusted under 35 U.S.C. 154(b) by 0 days.

(21) Appl. No.: 19/290,857

(22) Filed: Aug. 5, 2025

Related U.S. Application Data

(60) Provisional application No. 63/687,823, filed on Aug. 28, 2024.

(51) Int. Cl.
*F16L 41/06* (2006.01)

(52) U.S. Cl.
CPC .................................... *F16L 41/06* (2013.01)

(58) Field of Classification Search
CPC ......... F16L 41/04; F16L 41/045; F16L 41/06; F16L 41/065; F16L 41/16
See application file for complete search history.

(56) References Cited

U.S. PATENT DOCUMENTS

| 3,298,717 | A | * | 1/1967 | Rothwell | F16L 41/06 |
| 3,694,009 | A | * | 9/1972 | Phillips | F16L 41/06 |
| 3,817,270 | A | * | 6/1974 | Ehrens | F16L 41/065 |
| 5,199,145 | A | * | 4/1993 | McMillan | F16L 41/06 |
| 5,655,283 | A | * | 8/1997 | Driver | F16L 41/08 |

* cited by examiner

*Primary Examiner* — Zachary T Dragicevich
(74) *Attorney, Agent, or Firm* — J. Nevin Shaffer, Jr.

(57) ABSTRACT

A corporation stop and adjustable saddle apparatus method with an adjustable saddle configured to encircle a fluid pipe with an outside diameter, where the adjustable saddle is adjustable to encircle a fluid pipe with one outside diameter as well as a fluid pipe with a larger or smaller outside diameter and a corporation stop, with a face seal, connected with the adjustable saddle such that attaching the adjustable saddle to a fluid pipe presses the face seal against a portion of the outside diameter of the fluid pipe.

20 Claims, 2 Drawing Sheets

CORPORATION STOP AND ADJUSTABLE SADDLE APPARATUS AND METHOD

CROSS REFERENCE TO RELATED APPLICATION

This application claims the benefit of previously filed U.S. provisional patent application No. 63/687,823 filed Aug. 28, 2024 for an "Improved Fluid Delivery Apparatus and Method". The Applicant hereby claims the benefit of this provisional application under 35 U.S.C. § 119. The entire content of this provisional application is incorporated herein by this reference.

FIELD OF THE DISCLOSURE

The present invention pertains to a corporation stop and adjustable saddle apparatus and method having an adjustable saddle configured to encircle a fluid pipe with an outside diameter, where the adjustable saddle is adjustable to encircle a fluid pipe with one outside diameter as well as a fluid pipe with a larger or smaller outside diameter and a corporation stop, with a face seal, connected with the adjustable saddle such that attaching the adjustable saddle to a fluid pipe presses the face seal against a portion of the outside diameter of the fluid pipe.

BACKGROUND OF THE INVENTION

Fluid transfer is complicated. By way of example only and not by limitation, where the fluid is water for commercial and residential use, the transfer from main lines to a water meter requires several connections. The prior art systems are deficient in that they are complex interconnections that are prone to leak and fail, that are hard to repair and that are not readily adaptable to differences in pipe diameters, for example only. Further many prior art systems claim to be lead free but in reality contain some amount of lead in the parts. Lead contamination at any level is a health hazard, particularly when the fluid is drinking water.

Thus, there is a need in the art for a process that addresses the aforementioned problems in a manner that is robust and flexible so as to accommodate a full spectrum of fluid transfer pipes shapes and dimensions, that eliminates lead from connection elements and that is economical.

It therefore is an object of this invention to provide an improved liquid distribution apparatus and method that is easy to use and economical to install and operate.

SUMMARY

Accordingly, corporation stop and adjustable saddle consists of an adjustable saddle configured to encircle a fluid pipe with an outside diameter, where the adjustable saddle is adjustable to encircle a fluid pipe with one outside diameter as well as a fluid pipe with a larger or smaller outside diameter and a corporation stop, with a face seal, connected with the adjustable saddle such that attaching the adjustable saddle to a fluid pipe presses the face seal against a portion of the outside diameter of the fluid pipe.

In one aspect, the adjustable saddle is made of flexible material configured to conform to and encircle a fluid pipe that is not round.

In another aspect, the adjustable saddle and corporation stop are made of stainless steel.

In one aspect, the corporation stop includes a cylindrical petcock over molded with a flexible seal.

In one aspect, the flexible seal is a flexible silicon rubber or plastic seal.

In another aspect, the invention further includes a lock bracket configured to connect with and prevent movement of the cylindrical petcock.

In a further aspect, the adjustable saddle consists of two parts where the two parts are configured to hold the corporation stop in between when connected together.

In another aspect, the adjustable saddle includes an interior side closest to the fluid pipe and an exterior side and where when connected together the two parts hold the face seal on the interior side and against the fluid pipe.

In one aspect, the corporation stop and adjustable saddle are made of stainless steel with zero percent lead.

In one aspect, the face seal is visible when the adjustable saddle and corporation stop are placed on the fluid pipe such that a user is able to see the face seal.

According to another embodiment, a corporation stop and adjustable saddle apparatus includes an adjustable saddle configured to encircle a fluid pipe with an outside diameter where the adjustable saddle is adjustable to encircle a fluid pipe with one outside diameter as well as a fluid pipe with a larger or smaller outside diameter. A corporation stop, with a face seal, connected with the adjustable saddle such that attaching the adjustable saddle to a fluid pipe presses the face seal against a portion of the outside diameter of the fluid pipe where the face seal is visible when the adjustable saddle and corporation stop are placed on the fluid pipe such that a user is able to see the face seal and a cylindrical petcock over molded with a flexible seal connected with the corporation stop where the flexible seal provides an interference fit and sealing force.

In one aspect, the saddle is flexible such that it conforms to and encircles a fluid pipe that is not round.

In another aspect, the saddle and corporation stop are made of stainless steel.

In another aspect, the apparatus further includes a lock bracket configured to connect with and prevent movement of the cylindrical petcock.

In one aspect, the adjustable saddle consists of two parts where the two parts are configured to hold the corporation stop in between when connected together.

In another aspect, the adjustable saddle includes an interior side closest to the fluid pipe and an exterior side and where when connected together the two parts hold the face seal on the interior side and against the fluid pipe.

According to another embodiment, a corporation stop and adjustable saddle method consists of:

a. providing an adjustable saddle configured to encircle a fluid pipe with an outside diameter where the adjustable saddle is adjustable to encircle a fluid pipe with one outside diameter as well as a fluid pipe with a larger or smaller outside diameter; a corporation stop, with a face seal, connected with the adjustable saddle such that attaching the adjustable saddle to a fluid pipe presses the face seal against a portion of the outside diameter of the fluid pipe where the face seal is visible when the adjustable saddle and corporation stop are placed on the fluid pipe such that a user is able to see the face seal and a cylindrical petcock over molded with a flexible seal connected with the corporation stop where the flexible seal provides an interference fit and sealing force; and b. connecting the adjustable saddle with a fluid pipe.

In one aspect, the method further includes a lock bracket configured to connect with and prevent movement of the cylindrical petcock.

In another aspect, the adjustable saddle consists of two parts where the two parts are configured to hold the corporation stop in between when connected together and where the adjustable saddle includes an interior side closest to the fluid pipe and an exterior side and where when connected together the two parts hold the face seal on the interior side and against the fluid pipe.

In one aspect, the corporation stop and adjustable saddle are made of stainless steel with zero percent lead.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF EMBODIMENTS

Figure 1:
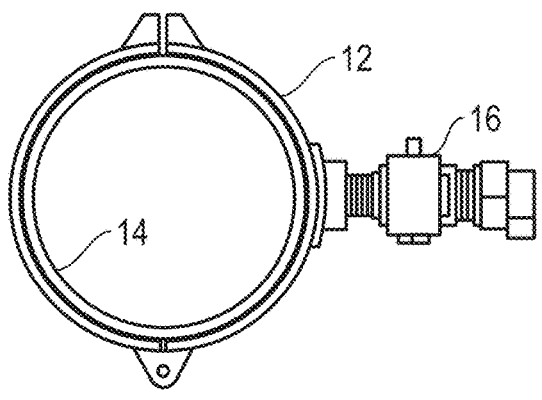
FIG. 1 is a side view of a Prior Art fluid pipe connection.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention. For example, the specific sequence of the described method may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

Figure 2:
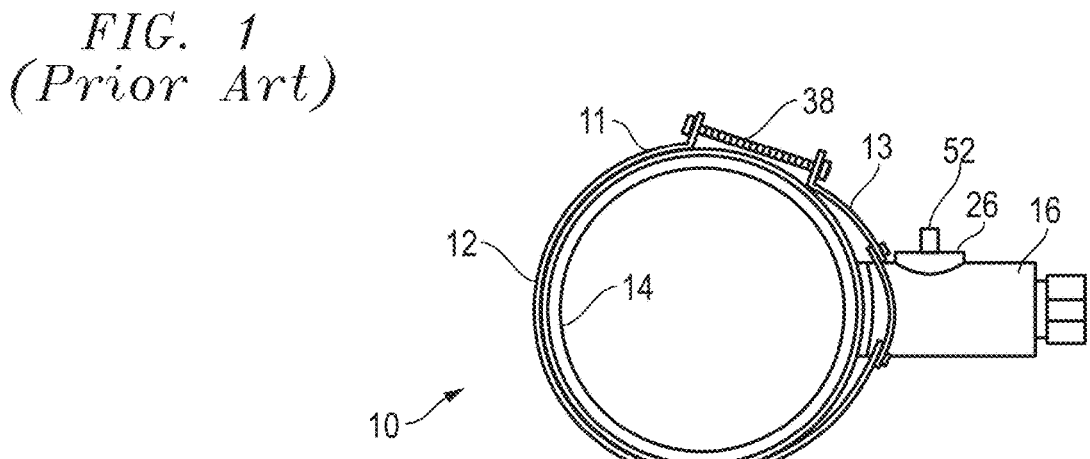
FIG. 2 is a side view of the corporation stop and adjustable saddle of the present invention.

One embodiment of the present invention is illustrated by way of example in FIGS. 2-6. Referring to FIG. 2, corporation stop and adjustable saddle apparatus and method 10 includes an adjustable saddle 12 configured to encircle a fluid pipe 14 with an outside diameter, OD, where the adjustable saddle 12 is adjustable to encircle a fluid pipe 14 with one outside diameter, "D", as well as a fluid pipe 14 with a larger "D+" or smaller outside diameter "D–".

A corporation stop 16, with a face seal 18, is connected with the adjustable saddle 12 such that attaching the adjustable saddle 12 to a fluid pipe 14 presses the face seal 18 against a portion of the outside diameter of the fluid pipe 14 and seals it completely. Uniquely, Applicant's invention combines the corporation stop 16 as an integral part of the adjustable saddle 12. Once the corporation stop 16 is attached with the adjustable saddle 12, the adjustable saddle 12 is placed around the fluid pipe 14, no matter the outside diameter of the fluid pipe 14. Draw bolt 38 draws ends 11 and 13 of the adjustable saddle 12 together and, uniquely, at the same times securely seals the face seal 18 of corporation stop 16 against the fluid pipe 14.

FIG. 1 illustrates the Prior Art system which includes a saddle 12 that is fixed in size such the state of the art is that a user must have multiple sizes of saddles 12 to accommodate fluid pipes 14 of different outside diameters. Certainly, the Prior Art saddles must be drawn together to secure them in place and in that sense only are they "adjustable". However, again, the Prior Art saddles are not able to adjust to pipes with actual meaningful different diameters and sizes. Anything more than normal minimal production size differences are not capable of being accommodated by the Prior Art.

Further, and most importantly, as shown in FIG. 1, the Prior Art requires a National Pipe Taper ("NPT") connection from the saddle 12 to the corporation stop 16. These Prior Art connections are prone to leak and fail and add additional hardware and expense to the process.

Figure 3:
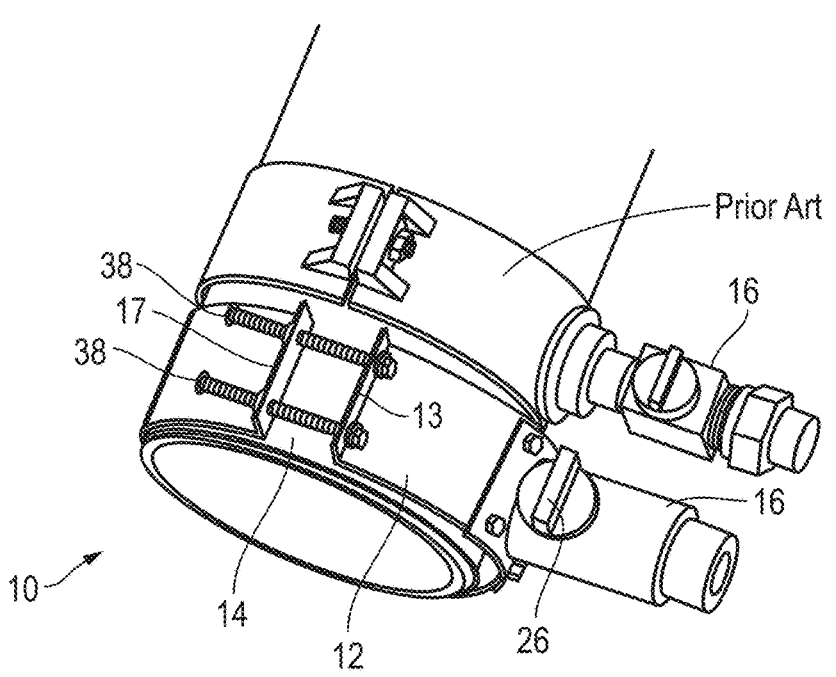
FIG. 3 is a top view side by side comparison of the Prior Art and the invention of FIG. 2.

FIG. 3 is a side-by-side comparison of the Prior Art and the present invention and illustrates the complexity and limitations of the Prior Art as compared with the corporation stop and adjustable saddle 10 of the present invention with its adaptable, adjustable saddle 12 and integral corporation stop 16.

Figure 4:
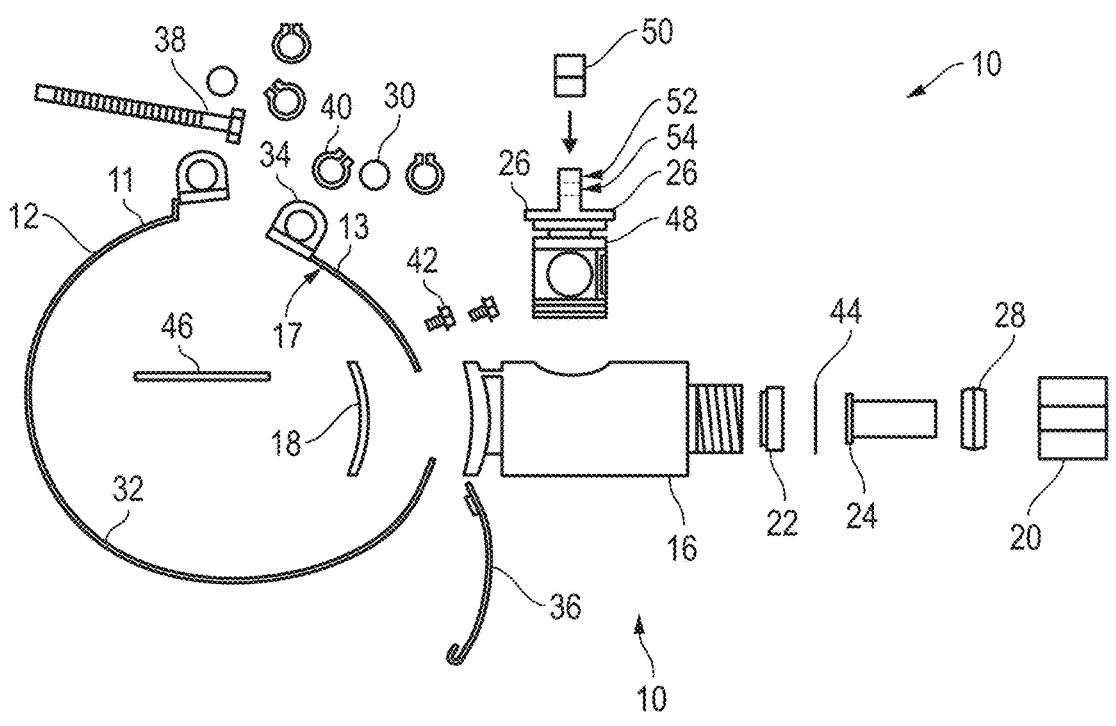
FIG. 4 is an exploded view of the invention of FIG. 2.

FIG. 4, by way of example only and not by limitation, is an exploded view of the particular components of the present invention including compression tube fitting 20, plastic pipe compression seal 22, stiffener insert 24, petcock 26, tube collet 28, draw pin 30, strap assembly 32, pipe bolt bracket 34, connect bracket 36, draw bolt 38, curb tap face seal 18, circlip 40, flange hex head screw 42, ferrule washer 44, corporation stop 16 body and spring pin 46.

Figure 5:
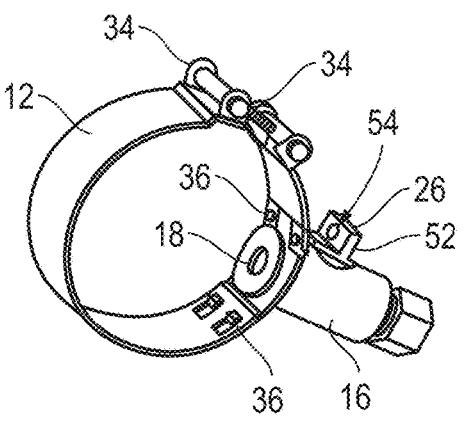
FIG. 5 is a perspective view of the invention of FIG. 2.
Figure 6:
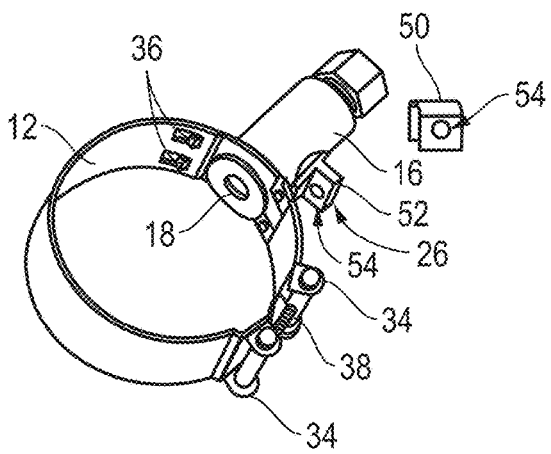
FIG. 6 is another perspective view of the invention of FIG. 2.

FIGS. 5 and 6 are perspective views further illustrating the integral combination. These figures illustrate that the first end 15 of corporation stop 16 is placed in between two major elements of the strap assembly 32, consisting of a separate independent section 17 of adjustable saddle 12, shown as including end 13 in FIG. 4, and the larger section of adjustable saddle 12. Once corporation stop 16 first end 15 is positioned on the inside of the independent section 17 and the larger section of adjustable saddle 12, the two separate sections are connected and held attached to each other by connect brackets 36 as shown in FIGS. 5 and 6. Once the adjustable saddle 12 is placed around a fluid pipe 14, draw bolt 38 is then used to draw face seal 18 tightly against the fluid pipe 14, sealing it in place no matter the diameter of fluid pipe 14.

As shown, in one aspect, the corporation stop 16 includes a cylindrical petcock 26 over molded with a flexible seal 48 and, in one aspect, Applicant has determined that a preferred flexible seal 48 is a flexible silicon rubber or plastic seal. Further, in one aspect, the adjustable saddle 12 is constructed of flexible material, of any suitable type, such that it is capable of encircling a fluid pipe 14 that is not round.

In one aspect, the apparatus further includes a lock bracket 50 configured to connect with and prevent movement of said cylindrical petcock 26. As shown, preferably cylindrical petcock 26 includes extension 52 used for operation of the valve. Extension 52 includes a hole 54 and lock bracket 50 fits over extension 52. Lock bracket 50 also has a hole 54 and when the two holes are aligned and a lock hasp (not shown for clarity) inserted therethrough the petcock 26 is secured against movement, either open or shut.

In a preferred embodiment, the adjustable saddle 12 and corporation stop 16 are made of stainless steel with zero percent lead thereby eliminating any chance of lead poisoning from these elements.

By way of further description, the adjustable saddle 12 and corporation stop 16 are designed and built to be one unit. The adjustable saddle 12 and corporation stop 16 preferably are made of stainless steel with zero (0%) lead. The adjustable saddle 12 fits all classes variations of fluid pipe 14 diameters. Typical, Prior Art, systems that perform this function in the field are made up of several parts that are joined using various plumbing connections. Instead, Applicant's invention uses the adjustable saddle 12 to create circumferential force to join the corporation stop 16 in such a manner as to create a radial force to push onto and connect with the fluid pipe 14 directly. As the connection draw bolt 38 tightens, the inward force increases to provide a seal without any intermediate plumbing joints. The face seal 18 provides all of the necessary sealing of the fluid pipe 14. This results in a far greater sealing capacity than a normal, Prior Art, "O" ring type face seal.

Further, preferably the adjustable saddle 12 is made of "flexible" material, that is material that conforms to fluid pipes 14 that are not round and yet provide sealing pressure that is applied by the torque of the attachment draw bolt 38 system to hold the adjustable saddle 12 in place and apply pressure to the whole circumference of the fluid pipe 14. Resultantly, there is no point load on the fluid pipe 14 that can cause the fluid pipe 14 to change its shape as happens with Prior Art systems.

By way of still further description, preferably, petcock 26 is cylindrical in form as shown and features a 100% opening, larger than industry standard with an over molded flexible seal 22 for longer life and better seal.

Uniquely, the face seal 18 that seals between the corporation stop 16 and the fluid pipe 14 is visible when the adjustable saddle 12 and corporation stop 16 are placed on the fluid pipe 14 such that a user is able to see the face seal 18 so as to insure it is in the correct position. Contrary to Prior Art systems, using the Applicant's present invention a user should never have a rolled gasket.

The corporation stop 16 has a full bore when the tap is made through the corporation stop 16, so that there is full unrestricted flow as per the size of the corporation stop 16. The corporation stop 16 preferably is rated at 325 PSI and is made of stainless steel. The corporation stop 16 has a compression fitting on the inlet end 15 with a water meter coupling on the other end.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A corporation stop and adjustable saddle apparatus comprising:
   a. an adjustable saddle configured to encircle a fluid pipe with an outside diameter, wherein the adjustable saddle is adjustable to encircle a fluid pipe with one outside diameter as well as a fluid pipe with a larger or smaller outside diameter; and
   b. a corporation stop, with a face seal, connected with the adjustable saddle such that attaching said adjustable saddle to a fluid pipe presses the face seal against a portion of the outside diameter of said fluid pipe and wherein the corporation stop includes a cylindrical petcock over molded with a flexible seal.

2. The apparatus of claim 1 wherein the adjustable saddle is made of flexible material configured to conform to and encircle a fluid pipe that is not round.

3. The apparatus of claim 1 wherein the adjustable saddle and corporation stop are made of stainless steel.

4. The apparatus of claim 1 wherein the flexible seal is a flexible silicon rubber or plastic seal.

5. The apparatus of claim 1 further including lock bracket configured to connect with and prevent movement of said cylindrical petcock.

6. The apparatus of claim 1 wherein the adjustable saddle consists of two parts wherein the two parts are configured to hold said corporation stop in between when connected together.

7. The apparatus of claim 6 wherein the adjustable saddle includes an interior side closest to the fluid pipe and an exterior side and wherein when connected together the two parts hold the face seal on said interior side and against the fluid pipe.

8. The apparatus of claim 1 wherein the corporation stop and adjustable saddle are made of stainless steel with zero percent lead.

9. The apparatus of claim 1 wherein the face seal is visible when the adjustable saddle and corporation stop are placed on the fluid pipe such that a user is able to see the face seal.

10. A corporation stop and adjustable saddle apparatus comprising:
   a. an adjustable saddle configured to encircle a fluid pipe with an outside diameter wherein the adjustable saddle is adjustable to encircle a fluid pipe with one outside diameter as well as a fluid pipe with a larger or smaller outside diameter;
   b. a corporation stop, with a face seal, connected with the adjustable saddle such that attaching said adjustable saddle to a fluid pipe presses the face seal against a portion of the outside diameter of said fluid pipe wherein the face seal is visible when the adjustable saddle and corporation stop are placed on the fluid pipe such that a user is able to see the face seal; and
   c. a cylindrical petcock over molded with a flexible seal connected with said corporation stop wherein the flexible seal provides an interference fit and sealing force.

11. The apparatus of claim 10 wherein the corporation stop and adjustable saddle are made of stainless steel with zero percent lead.

12. The apparatus of claim 10 wherein the saddle is flexible such that it conforms to and encircles a fluid pipe that is not round.

13. The apparatus of claim 10 further including a lock bracket configured to connect with and prevent movement of said cylindrical petcock.

14. The apparatus of claim 10 wherein the adjustable saddle consists of two parts wherein the two parts are configured to hold said corporation stop in between when connected together.

15. The apparatus of claim 14 wherein the adjustable saddle includes an interior side closest to the fluid pipe and an exterior side and wherein when connected together the two parts hold the face seal on said interior side and against the fluid pipe.

16. The apparatus of claim 10 wherein the flexible seal is a flexible silicon rubber or plastic seal.

17. A corporation stop and adjustable saddle method consisting of:

a. providing an adjustable saddle configured to encircle a fluid pipe with an outside diameter wherein the adjustable saddle is adjustable to encircle a fluid pipe with one outside diameter as well as a fluid pipe with a larger or smaller outside diameter; a corporation stop, with a face seal, connected with the adjustable saddle such that attaching said adjustable saddle to a fluid pipe presses the face seal against a portion of the outside diameter of said fluid pipe wherein the face seal is visible when the adjustable saddle and corporation stop are placed on the fluid pipe such that a user is able to see the face seal and a cylindrical petcock over molded with a flexible seal connected with said corporation stop wherein the flexible seal provides an interference fit and sealing force; and b. connecting said adjustable saddle with a fluid pipe.

18. The method of claim 17 further including a lock bracket configured to connect with and prevent movement of said cylindrical petcock.

19. The method of claim 17 wherein the adjustable saddle consists of two parts wherein the two parts are configured to hold said corporation stop in between when connected together and wherein the adjustable saddle includes an interior side closest to the fluid pipe and an exterior side and wherein when connected together the two parts hold the face seal on said interior side and against the fluid pipe.

20. The method of claim 17 wherein the corporation stop and adjustable saddle are made of stainless steel with zero percent lead.

* * * * *